United States Patent
Kotani

(10) Patent No.: US 7,352,955 B2
(45) Date of Patent: Apr. 1, 2008

(54) MANAGEMENT OF REPRODUCTION DURATION OF INFORMATION DATA

(75) Inventor: Takuya Kotani, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 957 days.

(21) Appl. No.: 10/623,591

(22) Filed: Jul. 22, 2003

(65) Prior Publication Data
US 2004/0126094 A1 Jul. 1, 2004

(30) Foreign Application Priority Data
Aug. 1, 2002 (JP) ............................. 2002-224884

(51) Int. Cl.
*H04N 5/93* (2006.01)
(52) U.S. Cl. ........................................................ 386/52
(58) Field of Classification Search ................... 386/69, 386/128, 52, 126, 95, 1, 109, 45, 55
See application file for complete search history.

(56) References Cited

U.S. PATENT DOCUMENTS

| | | | | |
|---|---|---|---|---|
| 6,266,483 B1* | 7/2001 | Okada et al. | ................ | 386/128 |
| 6,285,827 B1* | 9/2001 | Nakatani et al. | ............ | 386/126 |
| 6,816,666 B1* | 11/2004 | Kanai et al. | .................. | 386/52 |
| 7,027,711 B2* | 4/2006 | Nakatani | ...................... | 386/52 |
| 7,149,409 B2 | 12/2006 | Ohnishi | ....................... | 386/52 |

FOREIGN PATENT DOCUMENTS

| | | |
|---|---|---|
| JP | 2000-187963 | 7/2000 |
| JP | 2000-268536 | 9/2000 |
| JP | 2001-216767 | 8/2001 |
| JP | 2002-101381 | 4/2002 |
| JP | 2002-175680 | 6/2002 |
| JP | 2002-209190 | 7/2002 |

* cited by examiner

*Primary Examiner*—Thai Q. Tran
*Assistant Examiner*—Tat Chi Chio
(74) *Attorney, Agent, or Firm*—Fitzpatrick, Cella, Harper & Scinto

(57) ABSTRACT

A reproducing apparatus comprises a reproducing unit that reproduces a plurality of information data (media data which include movie data, still image data, and audio data), and management information, which contains duration information indicating reproduction durations of the information data, from a recording medium, and a control unit that controls a reproduction operation of the information data by the reproducing unit on the basis of the duration information reproduced by the reproducing unit, and reproduction control information (a play list) indicating a reproduction sequence of the plurality of information data.

14 Claims, 15 Drawing Sheets

[ MEDIA ] : : = ( "MOV" | "IMG" | "AUD" | "PLF" )

FIG. 4

| | |
|---|---|
| Clock-value | : : = (Full-clock-value \| Partial-clock-value \| Timecount-value) |
| Full-clock-value | : : = Hours " : " Minutes " : " Seconds ( " . " Fraction) ? |
| Partial-clock-value | : : = Minutes " : " Seconds ( " . " Fraction) ? |
| Timecount-value | : : = Timecount ( " . " Fraction) ? ( Metric) ? |
| Hours | : : = DIGIT+; any positive number |
| Minutess | : : = 2DIGIT; range from 00 to 59 |
| Seconds | : : = 2DIGIT; range from 00 to 59 |
| Timecount | : : = DIGIT+ |
| 2DIGIT | : : = DIGIT DIGIT |
| DIGIT | : : = [ 0-9 ] |

FIG. 5

```
<COLLECTION>
<MOV src="MOV_0001.MPG" id="MOV_0001" type="movie" dur="00:10.05" linkCount="2"/>
<MOV src="MOV_0002.MPG" id="MOV_0002" type="movie" dur="00:07.15"/>
</COLLECTION>
```

FIG. 6

```
<smil>
<body>
<par>
<seq>
<video src = '//VIDEO/MOV00010/MOV00010.4C#xpointer(//MOV[@id = "MOV_0001"])'/>
<video src = '//VIDEO/MOV00020/MOV00020.4C#xpointer(//MOV[@id = "MOV_0001"])'/>
</seq>
<seq>
<audio src = '//AUDIO/AUD00010/AUD00010.4C#xpointer(//AUD[@id = "AUD_0001"])'/>
</seq>
</par>
</body>
</smil>
```

FIG. 13

```
<COLLECTION>
<GROUP GROUP_NAME = "/VIDEO/MOV00010">
<MOV src="MOV_0001.MPG" id = "MOV_0001" type = "movie" dur = "00:10.05" linkCount="2"/>
<MOV src="MOV_0002.MPG" id = "MOV_0002" type = "movie" dur = "00:07.15" />
</GROUP>
<GROUP GROUP_NAME = "/AUDIO/AUD00010">
<AUD src="AUD_0001.MPG" id = "AUD_0001" type = "audio" dur = "00:10.05" linkCount="1"/>
</GROUP>
</COLLECTION>
```

MANAGEMENT OF REPRODUCTION DURATION OF INFORMATION DATA

FIELD OF THE INVENTION

The present invention relates to a reproducing apparatus and, more particularly, to the management of the reproduction duration of information data, which is designated by reproduction control information that designates the reproduction sequence of information data.

BACKGROUND OF THE INVENTION

Nowadays, data storage media such as memory cards used in digital cameras, magnetooptical disks used in digital disk cameras, and the like have dramatically increased capacities, and can record various data files such as movie data, audio data, still image data, and the like. In recent years, an edit function that sorts or combines recorded contents by exploiting random accessibility of such recording medium is attracting attention.

A save method of the edit result can be roughly classified into two methods. In one method, the edit result is reconstructed as new data. In the other method, only reproduction control information such as a reproduction sequence, layout, and the like is recorded, and files are accessed and reproduced in accordance with this reproduction control information in a reproduction mode.

In the former method, since the edit result forms new data, it is difficult to change the edit result after it is recorded. On the other hand, in the latter method, when only a part of a file to be reproduced is designated, it cannot always be displayed continuously with a file reproduced immediately before the designated file part due to file access timings or the like. Also, a file designated to be reproduced may have been erased, and the designated file cannot always be displayed as the reproduction result.

A method disclosed in Japanese Patent Laid-Open No. 2000-187963 may be used to assure reproduction continuity between files. In this invention, since data to be reproduced is designated using a pointer to a reproduction time map table, a file part to be reproduced can be determined in advance. The reproduction time map table in this invention indicates the start position of each MPEG decode unit.

However, with the invention described in the above reference, a description method of reproduction control information has a very limited format, and does not allow flexible description.

For example, as one of description methods of such reproduction control information, SMIL (Synchronized Multimedia Integration Language) is known. With SMIL, all of the reproduction start time, reproduction end time, and reproduction duration can be omitted from a description. However, the aforementioned method cannot handle such reproduction control information.

Even when reproduction control information is described in SMIL, if all of the reproduction start time, reproduction end time, and reproduction duration are omitted, a file to be reproduced must be opened to load data in accordance with the format of that file, and to acquire information of the reproduction duration of the file itself.

However, if that data format is not supported by a player or if the designated file is lost, information of the reproduction duration cannot be acquired.

For this reason, reproduction cannot be made in a sequence according to the reproduction control information, resulting in a failure.

For example, in SMIL, the reproduction start time can be described as a relative time from the reproduction end time of an immediately preceding file. In such description method, if the reproduction duration cannot be acquired, the reproduction start time of a file to be consecutively reproduced after that file cannot be settled.

SUMMARY OF THE INVENTION

The present invention has been made in consideration of the above situation, and has as its object to allow to reliably recognize the reproduction duration of information data designated by reproduction control information that describes the reproduction sequence of information data.

According to the present invention, the foregoing object is attained by providing a reproducing apparatus comprising; a reproducing unit that reproduces a plurality of information data, and management information, which contains duration information indicating reproduction durations of the information data, from a recording medium; and a control unit that controls a reproduction operation of the information data by the reproducing unit on the basis of the duration information reproduced by the reproducing unit, and reproduction control information indicating a reproduction sequence of the plurality of information data.

According to another aspect of the present invention, the foregoing object is attained by providing an apparatus for recording a plurality of information files each containing information data on a recording medium, comprising; a management file processing unit that generates a management file associated with the information files for each directory on the recording medium, where the information files are stored; and a recording unit that records the information files and the management file associated with the information files, which are stored in a single directory, on the recording medium.

In still another aspect of the present invention, the foregoing object is attained by providing an apparatus for recording information data on a recording medium, comprising; a management information processing unit that generates management information which contains identification information used to identify the information data recorded on the recording medium; a recording unit that records the management information generated by the management information processing unit on the recording medium; and a control information processing unit that generates reproduction control information indicating a reproduction sequence of a plurality of information data recorded on the recording medium by designating the information data recorded on the recording medium using the identification information.

In still another aspect of the present invention, the foregoing object is attained by providing an apparatus for reproducing a plurality of information data recorded on a recording medium, comprising; a reproducing unit that reproduces a plurality of information data and management information associated with the plurality of information data from the recording medium; an instruction unit that instructs to delete arbitrary information data from the plurality of information data recorded on the recording medium; a management information processing unit that appends a deletion attribute indicating that the information data has been deleted from the recording medium, to management information of the deleted information data out of the information data, which are designated by reproduction control information indicating a reproduction sequence of the plurality of information data; and a display unit that identifiably displays the information data appended with the deletion attribute and other information data of the plurality of information data designated by the reproduction control information.

Other features and advantages of the present invention will be apparent from the following description taken in

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 shows an example of the format of dur attribute values in the management file;

FIG. 5 shows a description example of the management file according to the first embodiment of the present invention;

FIG. 6 shows a description example of a play list;

FIG. 13 shows a description example of a management file according to a second embodiment of the present invention;

DETAILED DESCRIPTION OF THE PREFERRED EMBODIMENTS

Preferred embodiments of the present invention will now be described in detail in accordance with the accompanying drawings.

First Embodiment

Figure 1:
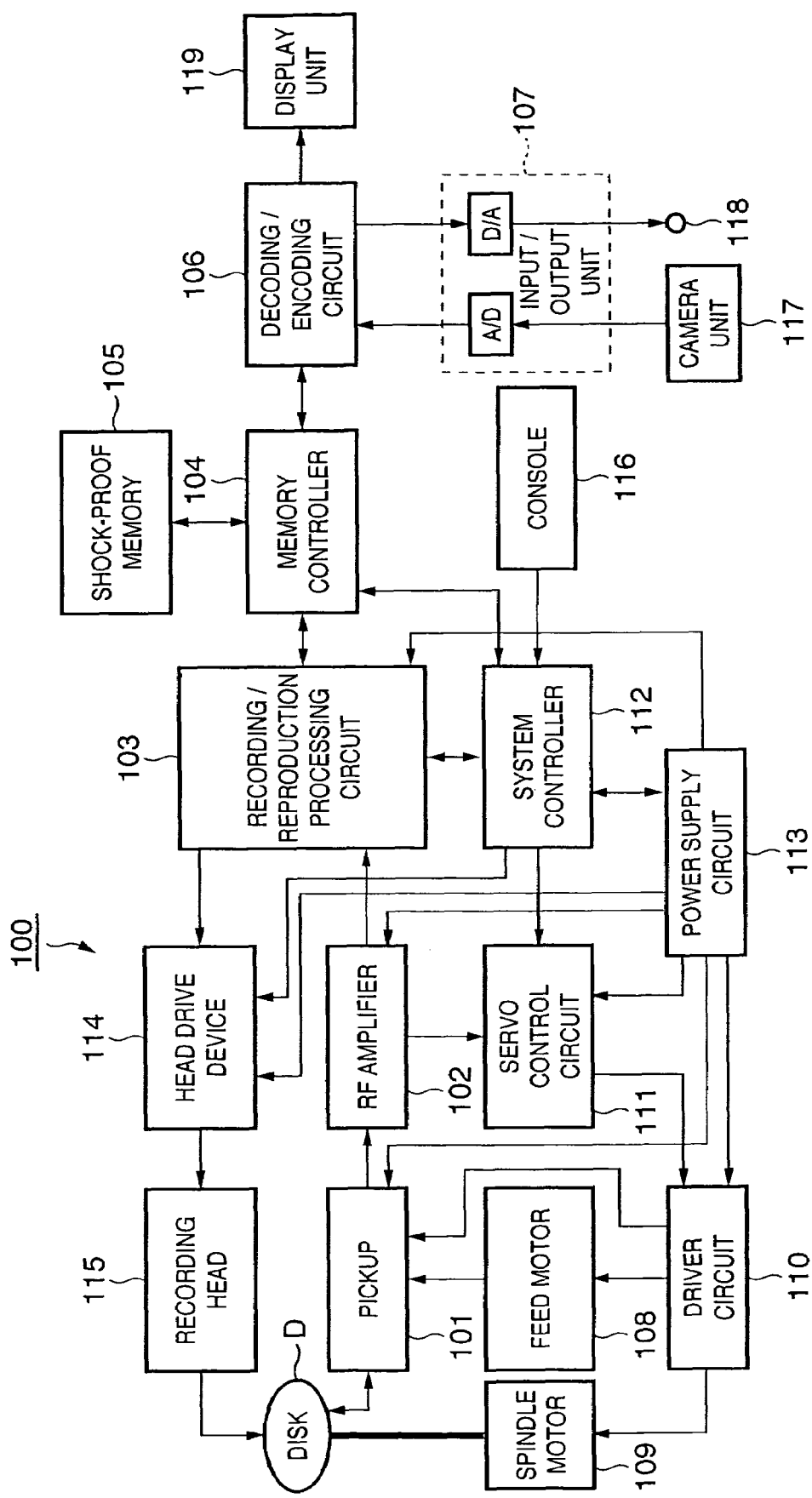
FIG. 1 is a block diagram showing the arrangement of a camera to which the present invention is applied.

FIG. 1 is a block diagram showing the arrangement of a digital video camera 100 to which the present invention is applied.

The video camera 100 of this embodiment comprises a pickup 101 for writing/reading out media data (movie data, audio data, and still image data recorded by an information recording/reproducing apparatus of the present invention will be generally referred to as "media data" hereinafter) on/from a disk D as a recording medium, an RF amplifier 102 for amplifying a readout signal, a recording/reproduction processing circuit 103, a shock-proof memory 105 for temporarily storing data, a memory controller 104 for controlling the shock-proof memory 105, a decoding/encoding circuit 106, an input/output unit 107 including a D/A converter and A/D converter, a feed motor 108, a spindle motor 109, a driver circuit 110, a servo control circuit 111, a system controller 112 for making various kinds of control, a power supply circuit 113, a head drive device 114, a recording head 115, a console 116, a camera unit 117, and an output terminal 118. Note that the disk D adopts, e.g., a magnetooptical disk. However, the present invention is not limited to such specific type of disk D.

According to such camera 100, in a reproduction mode, the disk D is rotated by the spindle motor 109 driven by the driver circuit 110, and the pickup 101 is fed in the radial direction of the disk D by the feed motor 108 driven by the driver circuit 110. Data read out by this pickup 101 is amplified by the RF amplifier 102, and the amplified data is output to the recording/reproduction processing circuit 103.

The RF amplifier 102 generates servo control signals such as a focus error signal, tracking error signal, and the like on the basis of reproduced data, and outputs these signals to the servo control circuit 111. The servo control circuit 111 drives the pickup 101, feed motor 108, and spindle motor 109 via the driver circuit 110 on the basis of the servo control signals from the RF amplifier 102 and a control signal from the system controller 112.

The recording/reproduction processing circuit 103 demodulates the signal amplified by the RF amplifier 102, applies processes such as error correction and the like to the demodulated signal, and sends the processed signal to the memory controller 104. The memory controller 104 writes the signal output from the recording/reproduction processing circuit 103 on the shock-proof memory 105. On the shock-proof memory 105, an area for storing TOC (Table Of Contents) information other than media data is assured in addition to a media data storage area. When the disk D is inserted into the camera 100, TOC information recorded at a predetermined address of the disk D is reproduced via the same route as media data, and is stored in the predetermined area on the shock-proof memory 105.

The memory controller 104 reads out required TOC information from the shock-proof memory 105 in response to a request from the system controller 112, and sends the readout TOC information to the system controller 112. The system controller 112 reads out media data stored in the shock-proof memory 105, and sends the readout media data to the decoding/encoding circuit 106. The decoding/encoding circuit 106 decodes reproduced data in accordance with a predetermined format using a data decoding circuit (not shown) and sends the decoded data to the D/A converter in the input/output unit 107. The D/A converter converts the decoded media data into an analog signal. This analog signal is externally output via the output terminal 118. Also, image data decoded by the decoding/encoding circuit 106 is sent to a display unit 119, which displays a reproduction image.

The system controller 112 controls the power supply circuit 113 to start/stop power supply to the pickup 101, RF amplifier 102, recording/reproduction processing circuit 103, servo control circuit 111, and driver circuit 110.

The console 116 has a pause button, play button, play/record mode select switch, image select cursor keys, and the like.

In a recording mode, an analog video/audio signal input from the camera unit 117 is sent to the A/D converter in the input/output unit 107. The A/D converter converts the analog video/audio signal into a digital signal. This digital signal is encoded to a predetermined format by an encoding circuit (not shown) in the decoding/encoding circuit 106, and the encoded signal is stored in the shock-proof memory 105 by the memory controller 104. Image data output from the input/output unit 107 is sent to the display unit 119 via the decoding/encoding circuit 106. The display unit 119 displays an image input from the camera unit 117.

The memory controller 104 reads out data stored in the shock-proof memory 105 and sends the readout data to the recording/reproduction processing circuit 103 under the control of the system controller 112. The recording/reproduction processing circuit 103 modulates the readout data, appends an error correction code to the modulated data, and so forth.

The system controller 112 controls the memory controller 104 to read out TOC information stored in the predetermined area of the shock-proof memory 105, recognizes the location of a recordable area on the disk D on the basis of this TOC information, and controls the servo control circuit 111 to search for a desired recordable area. After the search, the head drive device 114 drives the recording head 115 on the basis of the output signal from the recording/reproduction processing circuit 103, and a laser circuit (not shown) of the pickup 101 is driven on the basis of the output signal from the RF amplifier 102 under the control of the system controller 112, thus recording data on the disk D.

Upon completion of the recording operation on the desired recordable area, the system controller 112 controls the memory controller 104 to rewrite the TOC information in the disk D and that stored in the shock-proof memory 105, and uses the rewritten information as the latest TOC information to manage data recorded on the disk D and the like.

Upon deleting a file on the disk D, the system controller 112 rewrites the TOC information in the disk D and that stored in the shock-proof memory 105 in response to a file delete instruction from the console 116, and deletes a designated file from the disk D. Upon deleting the file, the system controller 112 changes the contents of a management file, as will be described later.

The system controller 112 executes control associated with recording and reproduction of various data, and generates and manages reproduction control information and a management file, as will be described later.

The formats of data to be handled in the first embodiment, and the processing method of these data will be described in turn.

Data to be handled by an information recording/reproducing apparatus according to the present invention, and their data formats will be explained. The types of data to be recorded by the camera will be explained first, and details of a directory structure used to store the data, management file, and play list will be described in turn.

Data to be recorded/reproduced in the first embodiment will be described.

Data (media data) to be recorded by the camera 100 of the first embodiment includes movie data, still image data, and audio data. Also, the camera 100 has a function of generating a reproduction control script (to be referred to as a "play list" hereinafter) used to reproduce movie data, still image data, and audio data in combination. Details of the play list will be described later.

Movie data is encoded and recorded in a format according to MPEG2. As data formats, PS (Program Stream) and TS (Transport Stream) formats are available, and one of these formats used to save data can be determined from a menu of the apparatus. Audio data is recorded in an MP3 (MPEG Audio Layer3) format. Still image data is recorded in a format compatible with DCF (Design rule for Camera File system).

Figure 2:
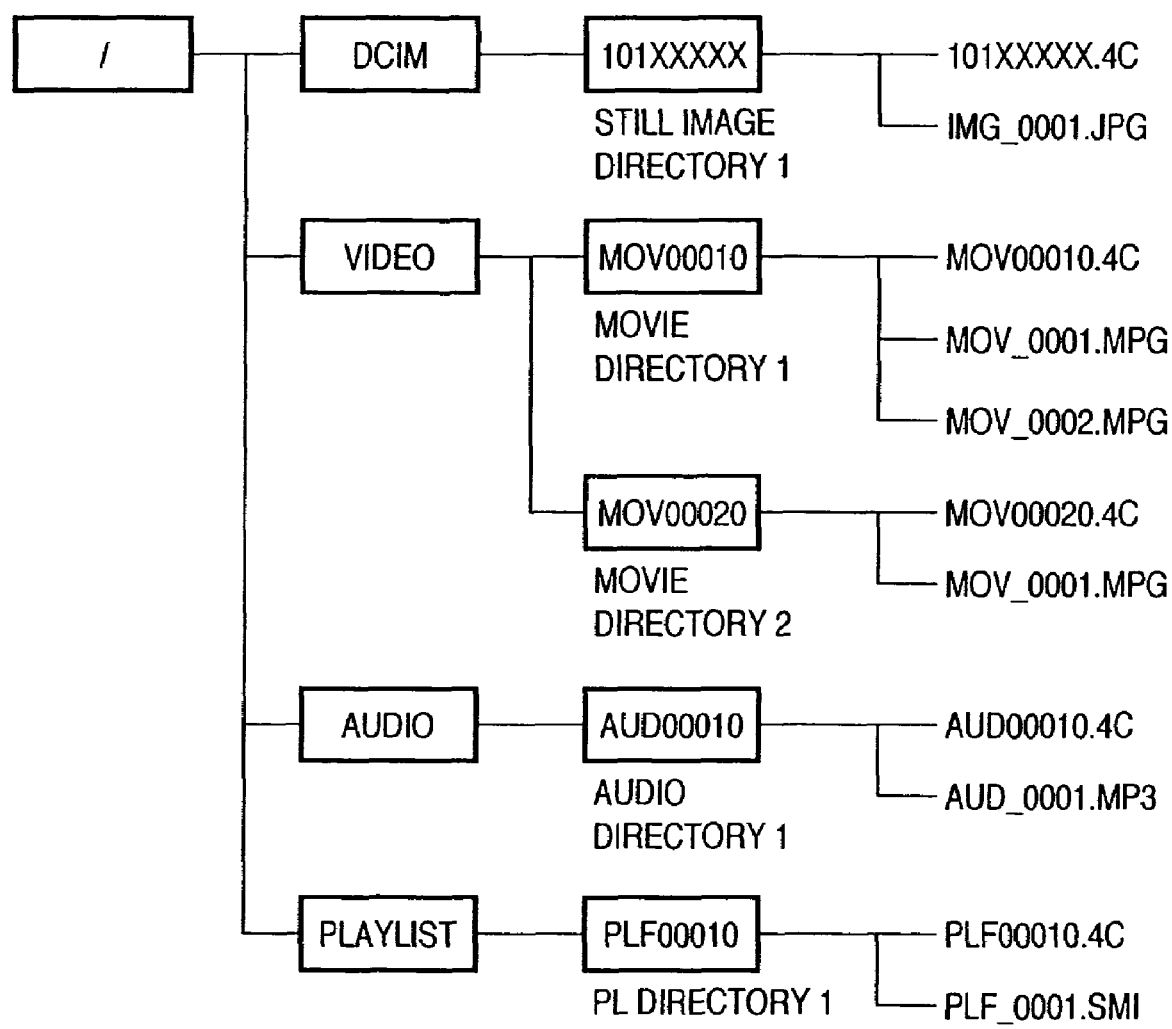
FIG. 2 shows the storage state of data on a disk according to a first embodiment of the present invention.

FIG. 2 shows an example of the storage state of movie data, audio data, still image data, and a play list in the disk D. Files with an extension "0.4C" are management files to be described later.

A play list is stored in a PLAYLIST directory created immediately under the root directory on the recording medium. A PL directory that stores a play list is created under the PLAYLIST directory, and stores a play list file (PLF).

Movie data is stored in a VIDEO directory created immediately under the root directory of the recording medium. Movie directories that store movie data are created under the VIDEO directory, and store movie data.

In the first embodiment, one movie directory stores one or more movie data. A method of storing a group of a plurality of image data in one movie directory will be described later.

Audio data is recorded in the same manner as movie data. The number of audio data files on the recording medium is expected to be relatively small. Hence, in this embodiment, 100 audio data files are stored together in one audio directory. The audio directory is created under an AUDIO directory created immediately under the root directory on the recording medium.

Still image data is stored in a DCIM directory created immediately under the root directory of the recording medium, as specified by DCF. A still image data file is actually stored in a still image directory crated under the DCIM directory.

The PL, movie, audio, and still image directories respectively store management files used to manage files stored in those directories. Details of the management files will be described below.

The management file will be described below.

Figure 3:
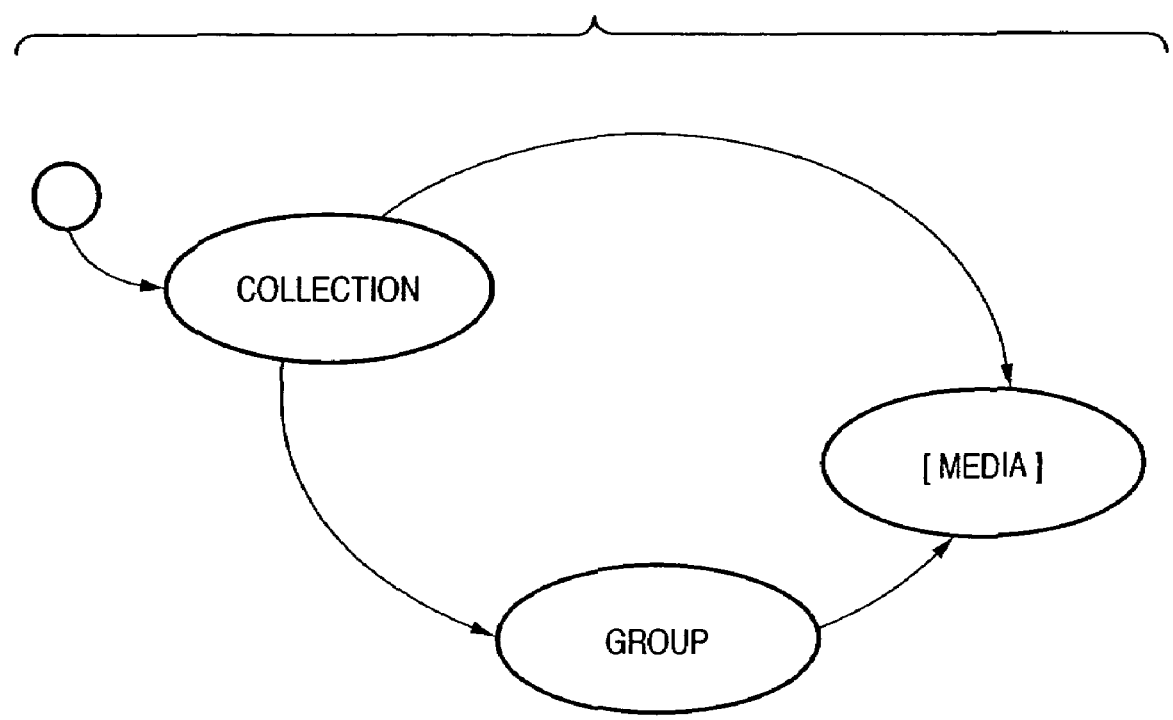
FIG. 3 shows the state of a management file.

The management file is a text file described in an XML format. FIG. 3 shows the element configuration of an XML document that forms the management file. FIG. 5 shows a description example of management information in a movie directory MOV00010 shown in FIG. 2.

Referring to FIG. 3, a COLLECTION element is a route element of the management file.

A GROUP element is used to group media objects such as movie data, still image data, audio data, and the like. The GROUP element has a GROUP_NAME attribute. The GROUP_NAME attribute is used to describe a group name. In the first embodiment, the GROUP element is not especially used.

An IMG element in [MEDIA] is used to describe entries of still image data. The IMG element has an src attribute, id attribute, type attribute, linkCount attribute, and deleted attribute. The src attribute is used to describe a file name. The id attribute is used to describe the identification name of a file. The identification name designated by the id attribute is unique in the management file. The type attribute represents the type of file, and assumes a value "image" in case of a still image. The attribute value of the linkCount attribute is an integer value, and indicates the number of links to entries from a play list. The deleted attribute is deletion information, and its attribute value is true or false. When a file is deleted while the linkCount attribute value is nonzero, the deleted attribute value is set to be true.

A MOV element in [MEDIA] is used to describe entries of movie data. The MOV element has an src attribute, id attribute, type attribute, linkCount attribute, and deleted attribute as in the IMG element, and also has a dur attribute. In case of a movie, the type attribute value is "movie". The dur attribute describes the reproduction duration of the entire movie data, and assumes a clock value. The clock value (Clock-value) is expressed in a format shown in FIG. 4.

For example, 14 minutes 3 seconds are described as "00 : 14 : 03 " or "14 : 03".

An AUD element in [MEDIA] is used to describe entries of audio data. The AUD element has an src attribute, id attribute, type attribute, linkCount attribute, deleted attribute, and dur attribute as in the MOV element. In case of audio, the type attribute value is "audio".

A PLF element in [MEDIA] is used to describe PLF entries. The PLF element has an src attribute, id attribute, type attribute, linkCount attribute, deleted attribute, and dur attribute as in the MOV element. Since a PLF itself may be referred to from other play lists, the linkCount attribute and deleted attribute are prepared in the PLF element. In case of PLF, the type attribute value is "playlist".

An extension to be appended to a file name of each management file is "0.4C". An update process of this management information will be described later.

The play list will be described below.

In the first embodiment, the play list is described in a format complying with SMIL. Note that the src attribute used to designate the file name of a reproduction object assumes a file value. The file value (file-value) is expressed by:

file-value::=Manage-filename "#xpointer(//" Element-name "[@id="Object-id"])"

where "Manage-filename" is the management file name of a directory that stores an objective file.

"Element-name" is the element name of an objective entry, and it is MOV in case of movie data.

"Object-id" is the id attribute value appended to the entry of objective data. In this way, since links from the play list to respective files are defined via id attribute values, even when a given file name has been changed, the description of the play list need not be changed, and only the src attribute value that describes the file name in an entry of the aforementioned management file need be changed.

Figure 7:
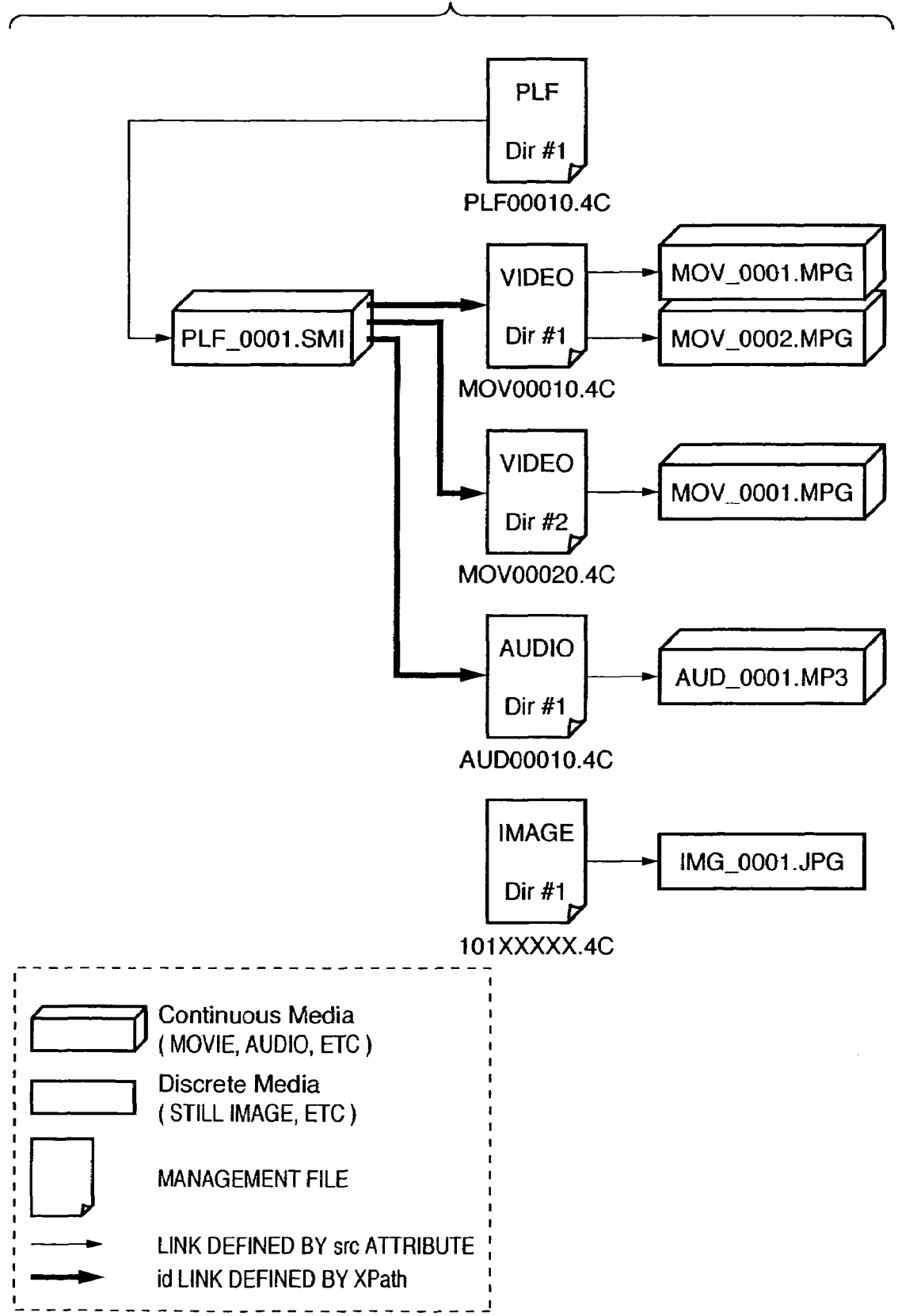
FIG. 7 shows the link relationship between the management files and various information data files.

For example, assume that still image data with an identifier "IMG_0001" is stored in /DCIM/101GANON/101GANON.4C. A link to this file is described by '/DCIM/101GANON/101GANON.4C#xpointer(//[@id="IMG_0001"])'. FIG. 6 shows a description example of the play list. FIG. 7 shows the link relationship between management files and data files via the play list shown in FIG. 6.

Upon reproducing the play list, a referred entry may have a deleted attribute value=true. As described above, a file as a link destination has been deleted in such case. A process associated with such situation will be described later.

Upon generating or changing a play list, the user designates a reproduction order or sequence of files on the disk D from the console 116. The system controller 112 generates a play list shown in FIG. 6 in accordance with an instruction from the console 116, and records it in the PLAYLIST directory on the disk D. In the first embodiment, the contents of the management files are changed upon generating or changing the play list, as will be described later.

The processes for the management files and play list will be described below.

All processes associated with the management files and play list are executed by the system controller 112. The system controller 112 executes change processes and the like of the management files and play list in accordance with various instructions such as a recording instruction, play instruction, and the like from the console 116.

A data recording process for storing one or more movie data in one movie directory together will be described first, and a management file update process will then be described. Finally, a file compatibility process executed when a file to be reproduced upon reproducing a play list has been lost or has a format which is not supported by the camera 100 will be explained.

A grouping process upon recording will be described first.

In the first embodiment, movie or audio data which satisfy grouping conditions are combined into one group, and data which belong to an identical group are stored in one directory. In the first embodiment, only movie data are to be grouped.

Figure 8:
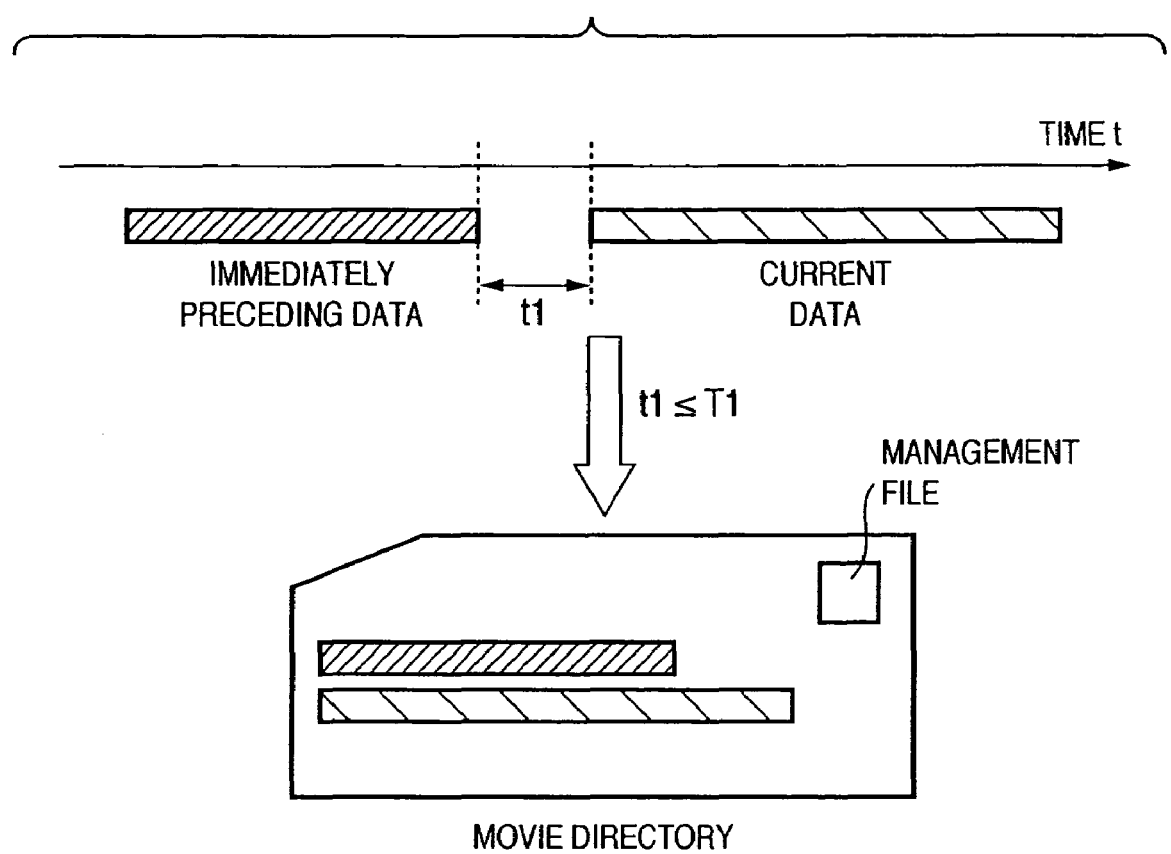
FIG. 8 shows the generation state of a directory upon recording.

FIG. 8 shows the grouping conditions in the first embodiment. In the first embodiment, movie data which simultaneously satisfies the following two conditions is stored in the same movie directory as data recorded immediately before the current data, as shown in FIG. 8.

1. Data to be recorded is continuous data of the same type as data recorded immediately before the current data. That is, the current data and immediately preceding data are two successive movie data or audio data. Still image data are not to be grouped.

2. A time period from the recording end time of movie data recorded immediately before the data to be recorded to the recording start time of the data to be recorded is T1 or less.

For example, T1=60 min in the first embodiment.

In the first embodiment, when movie data is MPEG2 data, whether it has the PS or TS format is indiscriminate. However, in order to improve the reproduction compatibility, only data with the same format may be grouped.

Figure 9:
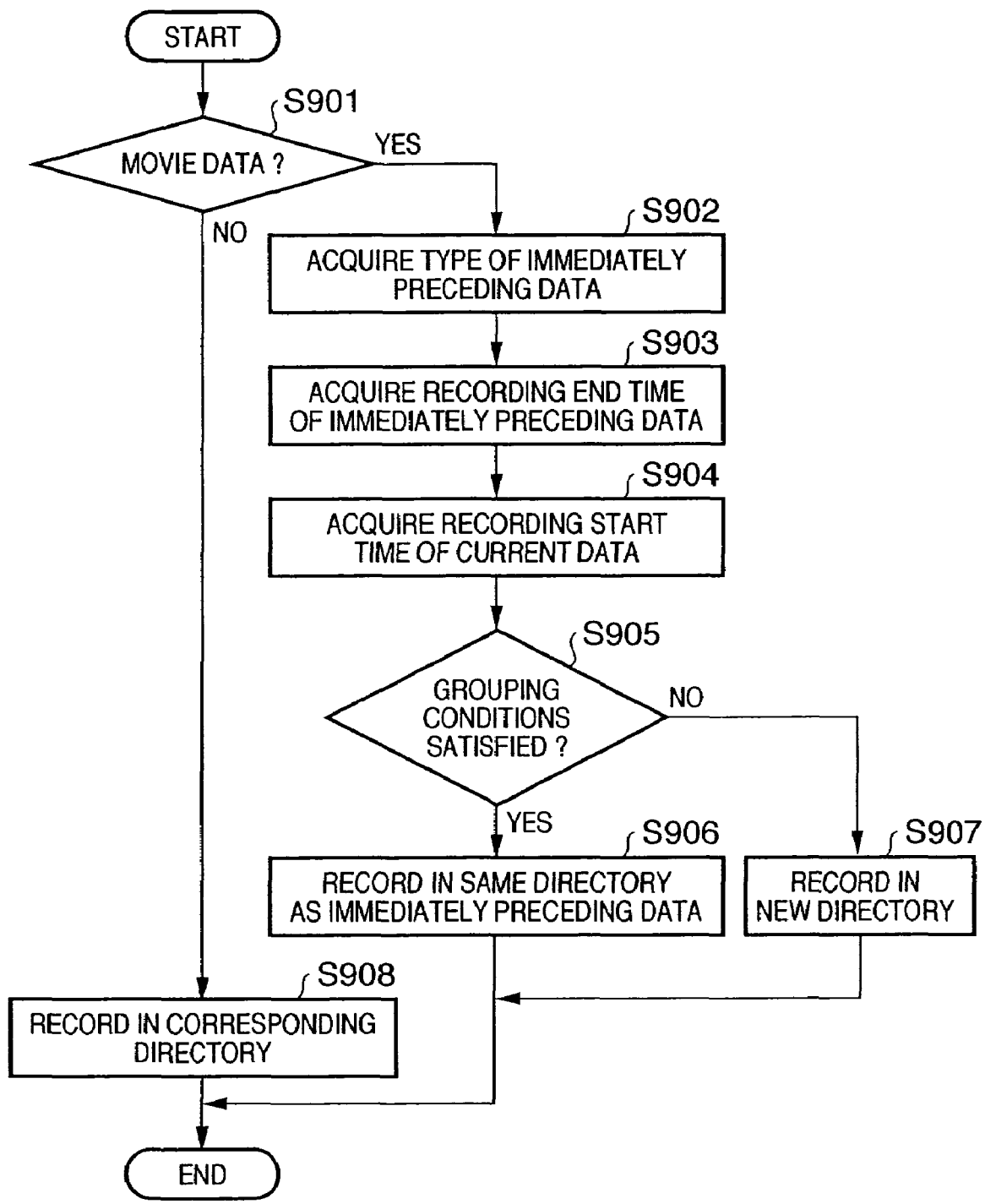
FIG. 9 is a flow chart showing a management file change process in a recording operation.

A grouping process upon recording will be described below using the flow chart in FIG. 9.

Upon receiving a recording start instruction, the system controller 112 checks in step S901 if the type of data to be recorded (to be referred to as "current data" hereinafter) is movie data. If NO in step S901, the flow advances to step S908. That is, if the current data is still image data, data is recorded in the format compatible to DCF, or if the current data is audio data, data is recorded in the audio directory, thus ending the process.

If the current data is movie data, the type of data recorded immediately before the current data (to be referred to as "immediately preceding data" hereinafter), and a recording end time t1' of the immediately preceding data are acquired (steps S902 and S903). Then, a recording start time t1 of the current data is acquired (step S904).

It is then checked using the acquired data in step S905 if the immediately preceding and current data are the same type and t1−t1'≦T1.

If the conditions are satisfied in step S905, the current data is recorded in the same movie directory as the immediately preceding data (step S906). On the other hand, if the conditions are not satisfied in step S905, a new movie directory is created, and the current data is recorded in the created directory (step S907), thus ending the process.

Upon recording movie data, a thumbnail image may be recorded in the movie directory. In this case, since still image data is recorded in the DCF compatible format, a thumbnail image of movie data preferably adopts a DCF thumbnail file format. A thumbnail file may be generated after data recording, or thumbnail data may be generated and recorded immediately after the first frame is recorded.

The processes of the management files will be explained below.

In the first embodiment, a management file change process is executed upon recording and deleting files of image data, audio data, and the like, and upon registering in a play list.

When a new file of movie data, still image data, or the like is recorded on the disk D, the system controller 112 creates a new entry in the management file in the directory corresponding to the recorded new data of those shown in FIG. 2, and registers that file. Upon registering the file, identification information and a file name are appended using id and src attributes, respectively, and when the file to be registered is a movie or audio file, its reproduction duration is appended using a dur attribute.

When a file is deleted, the process varies depending on the number of links held as the linkCount attribute value. The management file update process executed by the system controller 112 when a file other than a play list is deleted will be described below using the flow chart of FIG. 10.

A management file of a directory corresponding to a file to be deleted is reproduced from the disk D, and is stored in the shock-proof memory 105. From this management file, entry E1 of the file to be deleted is acquired (step S1001). It is checked if the linkCount attribute value of entry E1 is larger than zero (step S1002).

If it is determined in step S1002 that the linkCount attribute value is zero or no linkCount attribute value is found, entry E1 is deleted from the management file (step S1003).

On the other hand, if it is determined in step S1002 that the linkCount attribute value is larger than zero, a deleted attribute (deletion attribute) is appended to entry E1, and a deleted attribute value is set to be true. The changed management file is written in the original directory of the disk D (step S1004).

Upon completion of the process of the management file, TOC data is rewritten, and the file designated to be deleted is actually deleted, thus ending the process (step S1005).

In the first embodiment, the contents of the management file are changed upon generating or changing the play list.

When a new file is registered in the play list as a result of generating or changing the play list, the following process is executed.

A management file of a directory corresponding to a file to be registered is reproduced from the disk D, and is stored in the shock-proof memory 105. From this management file, entry E2 of the file to be registered is acquired. Then, the linkCount attribute value of entry E2 is incremented by 1. If no linkCount attribute value is found, a linkcount attribute is appended. In this case, the attribute value is 1. The rewritten management file is recorded in the original directory.

Figure 11:
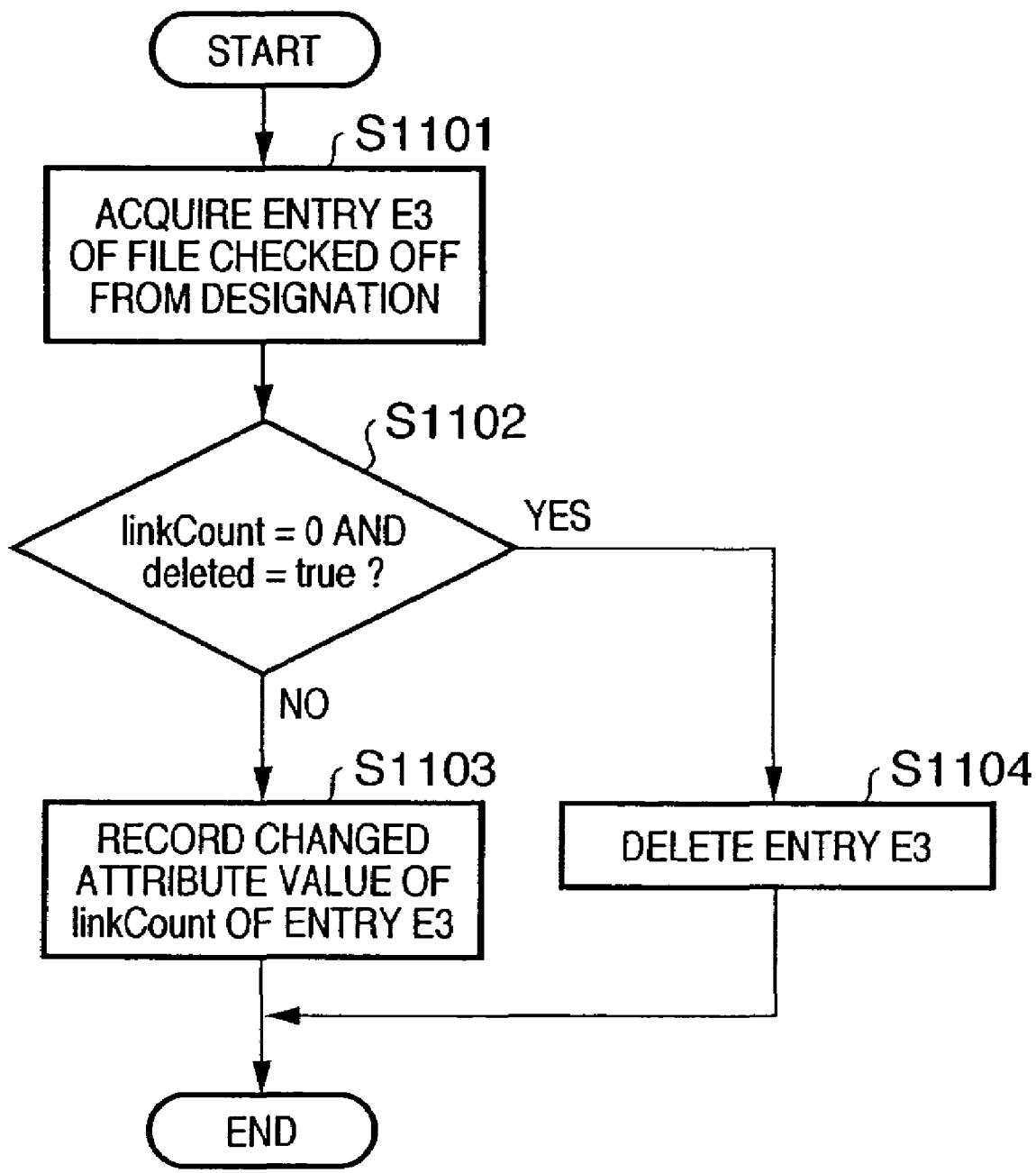
FIG. 11 is a flow chart showing a management file change process upon changing a play list.

For a file which is checked off from designation of a play list as a result of changing the play list, the following process is executed. FIG. 11 is a flow chart showing the process of the system controller 112 for a management file of a file, which is checked off from designation of a play list as a result of changing the play list.

Entry E3 of a file which is checked off from designation of the play list is acquired from a management file in a directory corresponding to that file (step S1101). The linkCount attribute value of entry E3 is decremented by 1. It is then checked if the linkCount attribute value is zero as a result of decrement, and the deleted attribute value is true (step S1102). If the linkCount attribute value is 1 or more, or the deleted attribute value is false, the changed linkCount attribute value is recorded on the disk D (step S1103).

At this time, if the deleted attribute value is false or no deleted attribute value is found, and the linkCount attribute value becomes zero, the linkCount attribute itself can be deleted from entry E3.

If the linkCount attribute value is zero and the deleted attribute is true, entry E3 is deleted from the management file (step S1104).

When the play list itself is deleted from the disk D, all files designated by the play list to be deleted are checked off from designation of the play list upon deletion of this play list. Hence, the process shown in FIG. 11 is repeated for management files of all the files designated by the deleted play list.

With this process, the identification name (the id attribute value in the entry of the management file) of an entry, all links to which are canceled, and which has no entity (file) can be reused.

By executing the management file update process in this way, the number of links from the play list to respective files can be managed for each file. By appending a deletion attribute (deleted attribute) to a file in the management file, reuse of the identification name (id attribute value) of the file which is referred to yet from the play list even after the file itself is deleted can be prevented, and deletion of the file can be recognized from all the play lists which refer to the deleted file.

A reproduction process using a play list will be described below.

In this case, the user selects a desired play list file from those recorded on the disk D by operating the console 116. The system controller 112 reproduces the play list file of user's choice from the disk D, and writes it in the shock-proof memory 105. The system controller 112 interprets the contents of this play list file, and reproduces movie, still image, and audio data files from the disk D in the designated sequence.

When the play list is described, as shown in, e.g., FIG. 6, no reproduction durations of respective files designated in the play list are described. Hence, in such case, the reproduction duration of each file is detected on the basis of the dur attribute value of that file described in the management file.

In the first embodiment, during the reproduction process using the play list or upon scheduling before reproduction after the user selects the play list, when it is determined that an entry of a file designated by the play list includes a deleted attribute, or when data to be reproduced has a data format which is not supported by the camera 100, a screen display is frozen for the same duration as the reproduction duration of that file. However, this process is applied only when an objective file is movie data or still image data. If an objective file is audio data, that data is not reproduced.

The process of the system controller 112 during the reproduction process using the play list will be described below using the flow chart of FIG. 12.

If a play list is selected, management files of all files designated by the selected play list are reproduced from the disk D and are written in the shock-proof memory 105. Then, entry Ei of each file is acquired (step S1201). A deleted attribute in the entry of the file is checked (step S1202).

If the deleted attribute value is not true or no deleted attribute is included, a file designated by the src attribute value in entry Ei of that file is opened, and it is checked if the data format of that file is compatible with the camera 100 (step S1203). If the file format is compatible, normal reproduction according to the play list is executed (step S1204).

If it is determined in step S1202 that the deleted attribute value is true or if it is determined in step S1203 that the data format is incompatible, the type of that file is checked (step S1205).

If the type of file is movie data, the reproduction sequence is changed to stop reproduction during a period designated by the dur attribute value included in entry Ei of that movie file (step S1206). If the type of file is still image data, reproduction is stopped during a reproduction period designated by the play list (step S1207). If the type of file is audio data, reproduction of that audio data is canceled (step S1208).

As described above, in the first embodiment, upon recording various data such as movie data and the like on the disk D, management files are recorded in the directories of the respective files. Attributes such as the file names, reproduction durations, and the like of respective files are stored in the management files. Furthermore, even when a given file is deleted, if this file is referred to from another file (play list), a deletion attribute is stored in the corresponding management information.

For this reason, during the reproduction process using the play list, when a file designated by the play list is not present on the disk or when that file is data with a format incompatible with the player, the reproduction duration of this file can be recognized by confirming the reproduction duration attribute in the management file without opening the file.

Since a non-reproduction duration equal to the reproduction duration of this file is assured, any failure during the reproduction process using the play list can be prevented. The reproduction process using the play list can be executed without adversely influencing the reproduction timings of other files designated in that play list.

Also, a warning dialog that informs a reproduction stop period, "incompatible file format", "no file is found", or the like may be displayed.

Second Embodiment

The second embodiment will be described below.

In the first embodiment, management information of each directory is recorded as a management file. However, as the number of management files becomes larger, it becomes harder to recognize whole files recorded on a recording medium.

Hence, the second embodiment combines management files into one file.

In this embodiment, a management file "MANAGE.4C" is allocated immediately under the root directory. FIG. 13 shows a description example of the management file according to the second embodiment.

In order to designate a directory, a GROUP element which is not used in a management file of the first embodiment is used. Files included in each directory are grouped using the GROUP element, thus realizing management for respective directories. A GROUP_NAME attribute value describes a full path of the corresponding directory name.

The description format of an src attribute in a play list changes accordingly. Since an id attribute value is unique in a play list, a link to a still image file with a file identifier "IMG_0001" is described by "/MANAGE.4C#xpointer(//IMG(@id="IMG_0001"))". With this link, if the play list is displayed using, e.g., a text editor, the file location cannot be easily specified. Hence, the following description may be used: //GROUP@GROUP_NAME="/DCIM/101GANON/"/IMG[@id="IMG_0001"]"). Using such management information, all contents recorded on the recording medium can be easily managed.

Third Embodiment

The third embodiment will be described below.

In the first embodiment, upon executing a reproduction process using a play list, the reproduction process is changed by confirming a management file of each file designated by the play list. The third embodiment will explain a process upon editing a play list.

Upon editing a play list, the user selects a play list to be edited by operating the console 116. The system controller 112 reproduces the file of the play list of user's choice from the disk D, and stores it in the shock-proof memory 105. Then, the system controller 112 interprets the contents of the play list and displays the reproduction durations, file names, and the like of files designated by the play list on the display unit 119 in accordance with a reproduction sequence. In this case, a file designated by the play list to be edited may not be present on the disk D, or may have an incompatible data format as in the first embodiment. Even in such case, the information of the reproduction timings of all files designated by the play list can be acquired.

The process of the system controller 112 associated with display of this edit window will be described below using the flow chart of FIG. 14.

After the play list is selected, management files of all files designated by the selected play list are reproduced from the disk D, and are written in the shock-proof memory 105. Entry Ej of each file is acquired (step S1401), and a deleted attribute in the entry of that file is checked (step S1402).

If the deleted attribute value is not true or no deleted attribute is included, a file designated by the src attribute value in entry Ej of that file is opened, and it is checked if the data format of that file is compatible to the camera 100 (step S1403). If the file format is compatible, a display indicating that the file can be normally reproduced is output (step 1404).

On the other hand, if it is determined in step S1402 that the deleted attribute value is true, a display indicating that the file has lost is output (step S1405). In this case, if this file is movie data or audio data, a dur attribute value of that entry Ej is confirmed, and information of the reproduction duration is displayed together.

If an incompatible data format is determined in step S1403, a display indicating the incompatible data format is output (step S1406). In this case, if this file is movie data or audio data, a dur attribute value of that entry Ej is confirmed, and information of the reproduction duration is displayed together.

Figure 15:
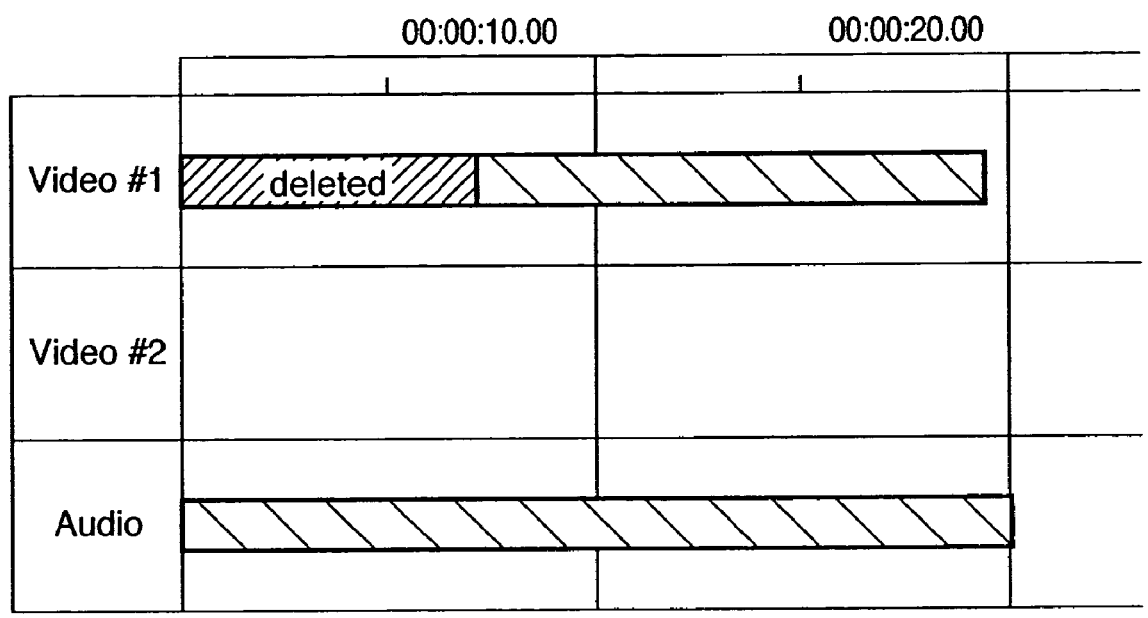
FIG. 15 shows a play list edit window according to the third embodiment of the present invention.

In this way, since the management file of each file is confirmed, and information to be displayed is changed in correspondence with the situation, the state of each file designated by the play list can be presented to the user. FIG. 15 shows an example of a displayed content indicating that the first movie file in a Video#1 track has lost. In FIG. 15, the first file has been deleted from the disk D, and information indicating the lost state with a length corresponding to the reproduction duration of that file is displayed.

As described above, in the third embodiment, upon editing a play list, the management file of each file designated by the play list is checked, and information indicating the state of each file is displayed. In addition, a display is changed in correspondence with the reproduction duration according to the dur attribute value in the management file. Hence, the user can easily confirm the state of each file designated by the play list upon editing the play list.

Other Embodiment

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Figure 10:
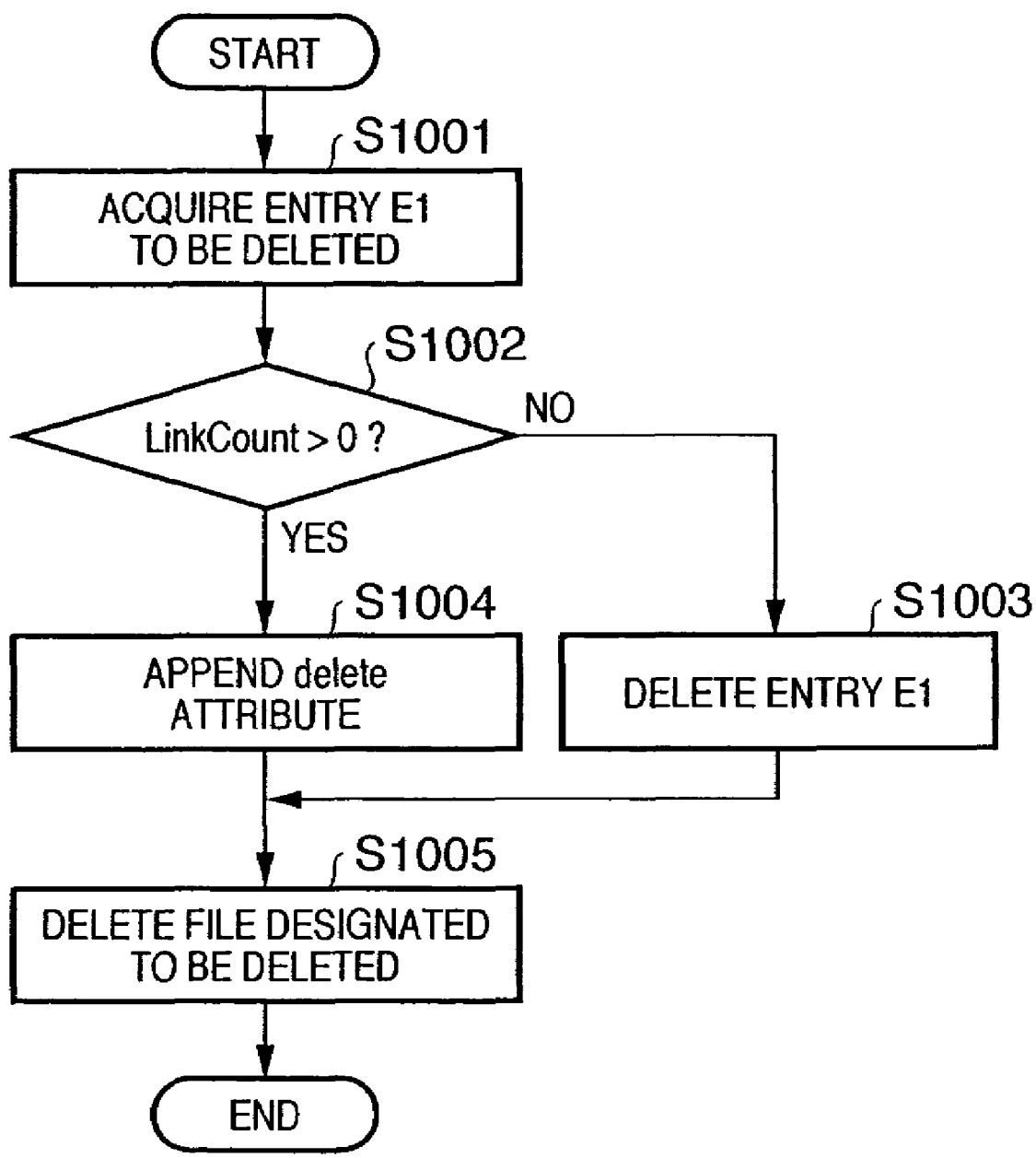
FIG. 10 is a flow chart showing a management file change process upon deleting a file.
Figure 12:
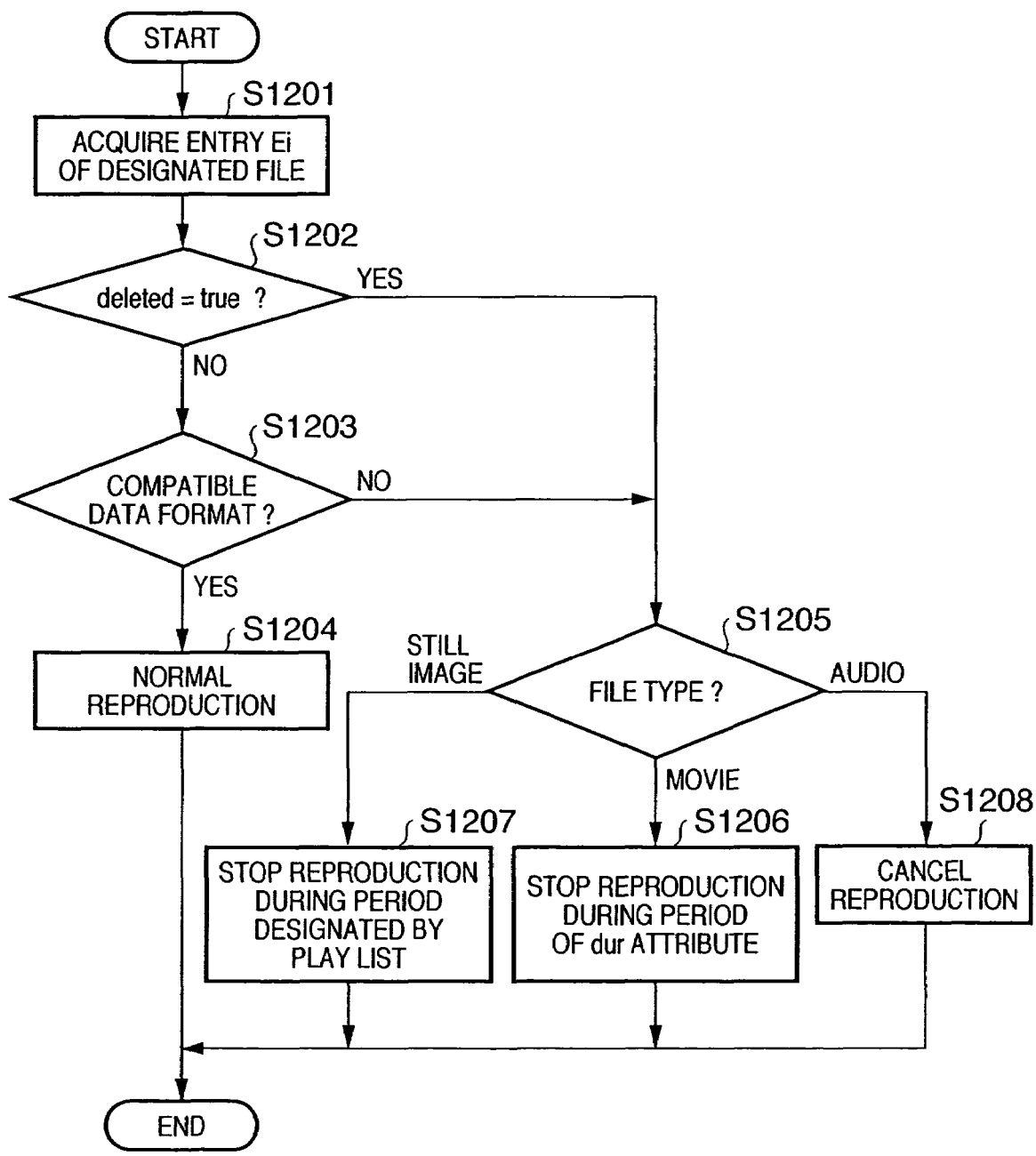
FIG. 12 is a flow chart showing a reproduction process according to the play list.
Figure 14:
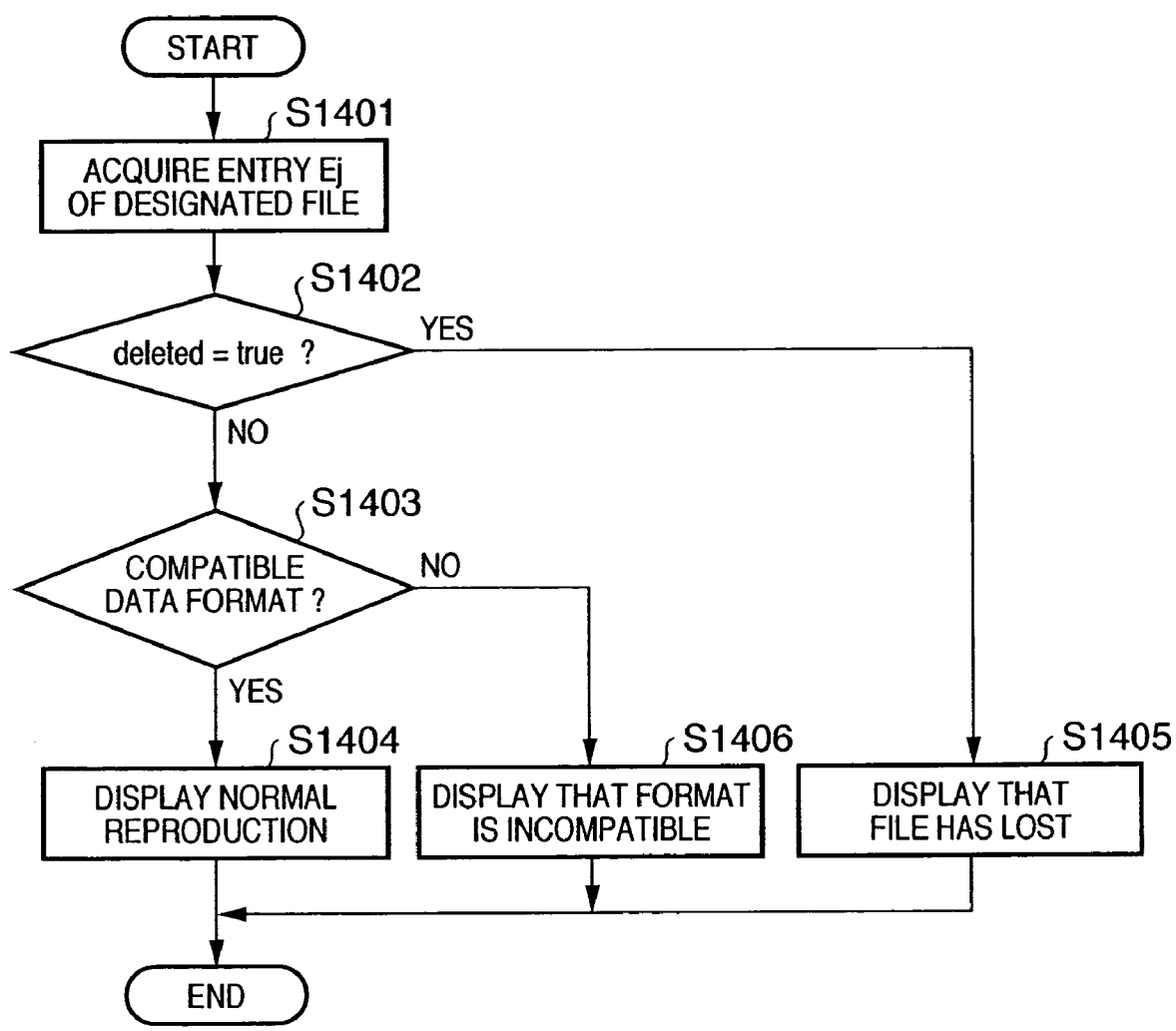
FIG. 14 is a flow chart showing a play list edit process according to a third embodiment of the present invention.

In a case where the present invention is applied to the aforesaid storage medium, the storage medium stores program codes corresponding to the flowcharts of FIGS. 10 to 12, and optionally FIG. 14 described in the embodiments.

The present invention is not limited to the above embodiments and various changes and modifications can be made within the spirit and scope of the present invention. Therefore to apprise the public of the scope of the present invention, the following claims are made.

What is claimed is:

1. A recording apparatus comprising:
    a management file processing unit that generates a management file associated with an information file containing information data;
    a recording unit that records a plurality of said information files and the management file associated with the information files on a recording medium; and
    a control information processing unit that generates reproduction control information indicating a reoroduction sequence of the plurality of information data recorded on the recording medium,
    wherein said management file includes link count information indicating a number of pieces of the reproduction control information which designate respective information data recorded on the recording medium, and deletion information indicating that an information data designated by the reproduction control information has been deleted from the recording medium, and
    wherein said management file processing unit changes a value of the link count information in correspondence with a change in reproduction sequence of the reproduction control information and determines, based on a value of the link count information of information data corresponding to a deletion instruction, whether or not the deletion information is to be appended to the management file.

2. The apparatus according to claim 1, wherein said management file processing unit appends the deletion information when a value of the link count information of the information data corresponding to the deletion instruction is not less than 1, and does not append the deletion information of the information data corresponding to the deletion instruction when the value of the link count information in the entry is zero.

3. The apparatus according to claim 1, wherein when said control information processing unit generates new reproduction control information, said management file processing unit increments a value of the link count information of each information data designated by the new reproduction control information.

4. The apparatus according to claim 1, wherein when the reproduction control information is deleted, said management file processing unit decrements a value of the link count information of each information data designated by the deleted reproduction control information.

5. The apparatus according to claim 1, wherein the management file includes type information indicating a type of information data.

6. The apparatus according to claim 1, wherein the management file includes duration information indicating a reproduction duration of the information data.

7. The apparatus according to claim 1, wherein said recording unit records the information file in a directory on the recording medium, and said recording unit determines a directory used to store a new information file to be recorded in accordance with a predetermined condition.

8. The apparatus according to claim 7, wherein when the new information file is to be recorded within a predetermined period of time after the information file recorded immediately before the new information file was recorded, said recording unit records the new information file in the same directory as the information file recorded immediately before the new information file.

9. The apparatus according to claim 7, wherein when the new information file is to be recorded after a predetermined period of time or more has elapsed since the information file recorded immediately before the new information file was recorded, said recording unit records the new information file in a new directory different from the information file recorded immediately before the new information file.

10. The apparatus according to claim 1,
    wherein said management file processing unit changes contents of the management file in accordance with new reproduction control information generated by said control information processing unit.

11. The apparatus according to claim 10, wherein the management file is described in a data description language, and the reproduction control information designates the information file in an Xpath/XPointer format.

12. The apparatus according to claim 1, wherein the management file has a predetermined extension.

13. The apparatus according to claim 1, wherein the management file includes identification information used to identify an information file.

14. The apparatus according to claim 13, wherein the reproduction control information is generated by designating information data recorded on the recording medium using the identification information.

* * * * *

UNITED STATES PATENT AND TRADEMARK OFFICE
CERTIFICATE OF CORRECTION

PATENT NO.         : 7,352,955 B2                                    Page 1 of 1
APPLICATION NO. : 10/623591
DATED              : April 1, 2008
INVENTOR(S)        : Takuya Kotani It is certified that error appears in the above-identified patent and that said Letters Patent is hereby corrected as shown below:

<u>COLUMN 13</u>:
Line 23, "reoroduction" should read -- reproduction --.

Signed and Sealed this

Second Day of September, 2008

JON W. DUDAS
*Director of the United States Patent and Trademark Office*